(12) United States Patent
Grigsby et al.

(10) Patent No.: US 11,927,749 B2
(45) Date of Patent: Mar. 12, 2024

(54) FOCUS ADJUSTMENT TECHNIQUE FOR THERMAL LENSES TO MINIMIZE IMAGE SHIFT

(71) Applicant: BAE Systems Information and Electronic Systems, Nashua, NH (US)

(72) Inventors: Will R. Grigsby, Austin, TX (US); Glen L. Francisco, Manor, TX (US); Matthew F. Kepler, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 639 days.

(21) Appl. No.: 17/019,409

(22) Filed: Sep. 14, 2020

(65) Prior Publication Data
US 2022/0082823 A1     Mar. 17, 2022

(51) Int. Cl.
*G02B 27/00* (2006.01)
*F41G 1/38* (2006.01)
*F41G 1/54* (2006.01)
*G02B 7/09* (2021.01)
*G02B 7/10* (2021.01)
(Continued)

(52) U.S. Cl.
CPC .......... *G02B 27/0068* (2013.01); *F41G 1/38* (2013.01); *F41G 1/54* (2013.01); *G02B 7/09* (2013.01); *G02B 7/102* (2013.01); *G02B 23/00* (2013.01); *G02B 23/12* (2013.01); *G02B 27/0101* (2013.01); *G02B 2027/0138* (2013.01); *G02B 2027/014* (2013.01); *G02B 2027/0141* (2013.01); *G03B 29/00* (2013.01)

(58) Field of Classification Search
CPC ...... G02B 27/0068; G02B 7/09; G02B 7/102; G02B 23/00; G02B 23/12; G02B 27/0101; G02B 2027/0138; G02B 2027/014; G02B 2027/0141; G02B 7/028; F41G 1/38; F41G 1/54; F41G 1/00–36; F41G 1/473; G03B 29/00
See application file for complete search history.

(56) References Cited

U.S. PATENT DOCUMENTS 4,142,799 A    3/1979  Barton
6,111,692 A *  8/2000  Sauter ................... G02B 23/14
                                                359/429
(Continued)

FOREIGN PATENT DOCUMENTS

CA         2981726 A1 * 12/2017  ............. A61B 34/20

*Primary Examiner* — Mustak Choudhury
(74) *Attorney, Agent, or Firm* — KPIP Law, PLLC; Gary McFaline

(57) ABSTRACT

A lens assembly for a weapon sight includes a first lens having an optical axis and a focal plane array (FPA) coaxial with the optical axis of the first lens. A first parameter of the first lens is selected that minimizes an error in image shift when the weapon sight lens assembly is adjusted for focus. The first parameter of the first lens can be at least one of a lateral position, axial displacement, thickness, effective focal length, material, effective focal length, radius of curvature, conic constants, and higher order aspheric coefficients of the first lens. A sensor can detect a position of the lens and a processor can compare the measured position to an ideal position and use a lookup table to display a corrected reticle position or corrected scene. An actuator may move the lens to the ideal position from the measured position.

15 Claims, 5 Drawing Sheets

(51) Int. Cl.
*G02B 23/00* (2006.01)
*G02B 23/12* (2006.01)
*G02B 27/01* (2006.01)
G03B 29/00 (2021.01)

(56) References Cited

U.S. PATENT DOCUMENTS

| | | | |
|---|---|---|---|
| 8,432,610 B2 | 4/2013 | Szapiel et al. | |
| 9,113,061 B1* | 8/2015 | Morley | H04N 23/69 |
| 2009/0266892 A1* | 10/2009 | Windauer | F41G 3/06 |
| | | | 235/404 |
| 2011/0113671 A1* | 5/2011 | Pochapsky | G02B 23/12 |
| | | | 42/111 |
| 2014/0002812 A1* | 1/2014 | Kepler | G02B 27/14 |
| | | | 356/138 |
| 2014/0110483 A1* | 4/2014 | Benson | H01L 23/576 |
| | | | 235/404 |
| 2016/0373718 A1* | 12/2016 | Bustin | G02B 7/028 |
| 2018/0252498 A1 | 9/2018 | Swarovski-Optik | |
| 2019/0316878 A1 | 10/2019 | Beckman | |
| 2019/0324260 A1* | 10/2019 | Hamilton | G02B 27/0101 |
| 2019/0377171 A1* | 12/2019 | Hammond | F41G 3/12 |
| 2020/0011641 A1 | 1/2020 | Baker | |
| 2020/0049455 A1 | 2/2020 | Hamilton et al. | |
| 2020/0284551 A1* | 9/2020 | Brown | G01S 17/08 |

* cited by examiner

FOCUS ADJUSTMENT TECHNIQUE FOR THERMAL LENSES TO MINIMIZE IMAGE SHIFT

FIELD OF THE DISCLOSURE

The present disclosure relates to lens assemblies and lens systems, and more particularly to lens assemblies and systems used in a weapon sight configured to engage a target.

BACKGROUND OF THE DISCLOSURE

Clip on weapon sights and standalone weapon sights must engage targets at various ranges, from near to far. To keep the target in focus at these various ranges, a focus adjustment of the optics is sometimes required. In systems where focus adjustment is needed, it has been traditionally accomplished by adjusting the distance between the focal plane array (FPA) and the optics assembly. Distance adjustment is made through either movement of the entire objective lens assembly, or by moving the focal plane. During the focus adjustment technique where the distance between the FPA and the objective lens is adjusted, unwanted movements can also occur. For instance, the lens and FPA can become misaligned in one or both axes orthogonal to the optical axis. Movement in the direction of the optical axis shall be defined as the Z-axis, and the orthogonal axes are then the X-axis and the Y-axis.

A mechanical assembly to adjust focus attempts to move only the mechanism along the Z-axis, however imperfections in mechanism, temperature variations, and other factors lead to cross coupling of movement along the X-axis and/or the Y-axis. This undesirable movement leads to a problem commonly referred to as "image shift" or "boresight misalignment." In clip-on and standalone weapon sights, image shift leads to a loss of weapon accuracy and a decreased probability of hitting a target. Movement along the optical axis (Z-axis) is the desired movement to adjust focus, however, any corresponding lateral or translational movements along the X-axis and the Y-axis are not desired, and lead to image shift, or the like.

Wherefore it is an object of the present disclosure to overcome the above-mentioned shortcomings and drawbacks associated with the conventional lens assemblies and lens assembly systems.

SUMMARY OF THE DISCLOSURE

It has been recognized that there can be an error in image shift, depending upon the arrangement and configuration of a lens assembly. Thus, a lens assembly according to the present disclosure is constructed to minimize an error in image shift, or which can be moved to an appropriate arrangement and configuration, to minimize the error in image shift. This is particularly important in weapon sights and other imaging assemblies that image and/or engage a target. The image shift error can be physically minimized (i.e., made as small as possible) by a specific construction and placement (or movement thereto) of the assembly components, or can be measured, calculated, and effectively removed from the imaging assembly.

One aspect of the present disclosure is a lens assembly for a weapon sight, the lens assembly comprising: at least a first lens, the lens assembly having an optical axis; and a focal plane array (FPA) coaxial with the optical axis of the lens assembly; the lenses assembly being configured to have an error ratio value less than unity via using a first parameter of each lens in the lens assembly to minimize an error in image shift, wherein the first parameter can be lateral position, axial displacement, thickness, material, effective focal length, radius of curvature, conic constants, and higher order aspheric coefficients.

One embodiment of the lens assembly further comprises a second lens coaxial with the optical axis of the first lens, wherein the first parameter of the first lens and a second parameter of the second lens are selected that further minimizes the error in image shift when the weapon sight lens motions are initiated, wherein the second parameter can be lateral position, axial displacement, thickness, material, effective focal length, radius of curvature, conic constants, and higher order aspheric coefficients.

Another embodiment of the lens assembly is wherein a third parameter of the lens assembly is selected that further minimizes the error in image shift, the third parameter comprising a lateral distance between the first lens and the second lens.

Yet another embodiment of the lens assembly further comprises a sensor coupled to the first lens that is configured to detect a measured position of the first lens.

In some cases, the lens assembly further comprises a processor that compares the measured position of the first lens to an ideal position for the first lens from a lookup table stored in memory. In certain embodiments, the lens assembly further comprises an actuator coupled to the first lens that is configured to move the first lens to the ideal position.

Another aspect of the present disclosure is a method for configuring a lens assembly for a weapon sight, the method comprising: placing a first lens within the lens assembly at a first position; placing a focal plane array within the lens assembly at a second position; and selecting a first parameter of the first lens such that an error in image shift is minimized; the lens assembly being configured to have an error ratio value less than unity via using a first parameter of each lens in the lens assembly to minimize an error in image shift, wherein the first parameter can be lateral position, axial displacement, thickness, material, effective focal length, radius of curvature, conic constants, and higher order aspheric coefficients.

One embodiment of the method further comprises calculating the error in image shift by a processor of the lens assembly.

Another embodiment of the method further comprises displaying an estimated position of a target in a field of view of the weapon sight; and displaying a corrected position of the target in the field of view of the weapon sight. In some cases, the method further comprises detecting a measured position of the lens with a sensor coupled to the lens assembly.

Yet another embodiment of the method further comprises comparing the measured position to an ideal position in a look up table stored in memory, calculating the error in image shift based on a difference between the measured position and the ideal position. In certain embodiments, the method further comprises comparing the measured position to an ideal position in a look up table stored in memory and moving the lens to the ideal position by an actuator coupled to the lens.

Yet another aspect of the present disclosure is a lens assembly for a weapon sight, the lens assembly comprising: a first lens having an optical axis; a focal plane array (FPA) coaxial with the optical axis of the first lens; a sensor coupled to the first lens that is configured to detect a measured position of the first lens; and a processor configured to compare the measured position of the first lens to an ideal position from a lookup table stored in memory; wherein a first parameter of the first lens is selected that minimizes an error in image shift, the lens assembly being configured to have an error ratio value less than unity via using a first parameter of each lens in the lens assembly to minimize an error in image shift, wherein the first parameter can be lateral position, axial displacement, thickness, material, effective focal length, radius of curvature, conic constants, and higher order aspheric coefficients.

One embodiment of the lens assembly further comprises an actuator coupled to the first lens that is configured to move the first lens to the ideal position from the lookup table stored in memory. In some cases, the processor is further configured to calculate an error based on a difference between the ideal position and the measured position.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A is a diagram illustrating the incoming light rays to a lens assembly having two lenses and a focal plane array with no lens translation error, according to one embodiment of the present disclosure;

DETAILED DESCRIPTION OF THE DISCLOSURE

One embodiment of a system disclosed herein reduces the image shift by having a translational error ratio of less than unity. The lens assembly (for example, a lens assembly used in a weapon sight) can be comprised of a plurality of lens elements, and the individual lens elements can be adjusted/moved to compensate for focus and eliminate image shift. The lens assembly can be configured and arranged to minimize an error in image shift when a weapon sight is used to engage the target. Image shift occurs when a movement along the Z-axis (for example, to correct focus) leads to an undesirable and detrimental cross-coupling of movement along the X-axis and/or Y-axis. In weapon sights, this image shift can lead to a loss of weapon accuracy and a decreased probability of hitting a target, or worse collateral damage from hitting an unintended target. The lens assembly according to the present disclosure minimizes this image shift when engaging a target, meaning that when the weapon is configured to fire upon a target and the target is visible within the weapon sight of the weapon. A weapon is considered to be engaged on a target when it is directed or pointed at the target such that the target is within the weapon sight and it is considered possible to fire on the target. As used herein, target can be any item typically fired upon by a weapon.

Figure 1:
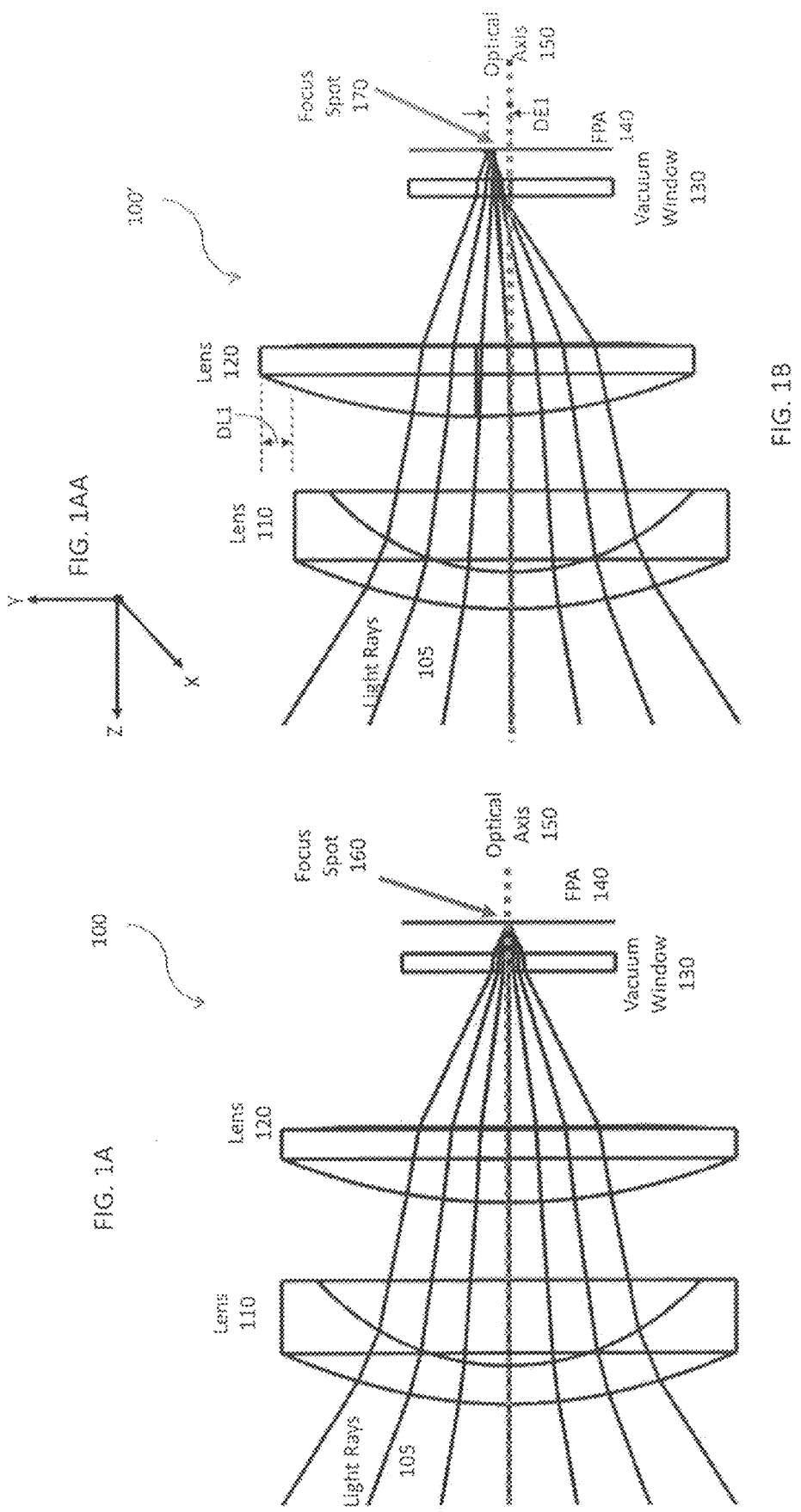
FIG. 1AA shows the axes orientation used in FIG. 1A and FIG. 1B.
FIG. 1B is a diagram illustrating the incoming light rays to a lens assembly having two lenses and a focal plane array with a lens translation error present in the lens assembly due to a displacement of one of the lenses with respect to the optical axis of the lens assembly.

Referring to FIG. 1A, a lens assembly 100 is shown having incoming light rays 105 to a lens assembly 100. In the figure, the incoming light rays 105 are shown as converging due to a lens element or lens assembly that is not shown. The lens assembly 100 in this example embodiment includes two individual lens elements, including a first lens 110 and a second lens 120. A vacuum window 130 is also included, positioned between the lens 120 and a focal plane array (FPA) 140. The vacuum window 130 allows the light beams to pass through while creating a boundary between the vacuum and air, which is necessary for many FPA that operate in the long wave and/or mid wave infrared spectrum. The vacuum window sealing the FPA is typically a plano-plano surface, imparting no optical power to the lens assembly, and hence lateral displacements of the window are inconsequential to image shift, and thus the presence of the window can generally be ignored for the purposes of this disclosure.

The lens assembly 100 has an optical axis 150, with the first lens 110, the second lens 120, and the FPA 140 each being coaxial with the optical axis 150. As shown in FIG. 1A, the lens 110, lens 120, and FPA 140 are all centered about the optical axis 150 of the lens assembly 150, such that there is no resulting lens translation error. Note that the focus spot 160 is at the center of the detector FPA 140, providing for both minimum error and maximum accuracy, for example when engaging a target.

Referring to FIG. 1AA, the axes of movement of the lens assembly are shown, with movement of lens elements, groups, or assemblies along the optical axis 150 (Z-axis) is generally used to adjust focus. The X-axis and the Y-axis of movement are also shown. As shown in the figure, movement of the second lens 120 could be used along the Z-axis to adjust lens focus, while maintaining the focal length, distortion, color correction, and other critical performance parameters of the lens.

There exist many mechanical assemblies that adjust focus by moving the lens assembly along the direction of the Z-axis, however imperfections in these mechanisms, temperature variations, and other factors often lead to an unwanted cross coupling of movement along the X-axis and Y-axis. This undesirable movement leads to a problem commonly referred to as "image shift" or "boresight misalignment." In clip-on and standalone weapon sights, for example, image shift leads to a loss of weapon accuracy and decreased probability of hitting a target.

FIG. 1B is a diagram illustrating a lens assembly 100' having a lens translation error, causing an image shift error. In the lens assembly 110', the incoming light rays 105' are shown as converging due to a lens element or lens assembly that is not shown. The lens assembly 100' in this example embodiment includes two individual lens elements 110 and 120 and a focal plane array 140 with a lens translation error present due to a displacement of one of the lenses with respect to the optical axis of the lens assembly. Note that in this lens assembly, the lens 120 is vertically (y axis) displaced a distance DL1, and this causes a problem due to the focus spot 170 of the lens assembly not being centered at the central optical axis of the detector FPA 140, but instead being offset by a distance of DE1.

Lens translation error, and thus image shift, causes an error when determining appropriate reticle position within the field of view of a weapon sight. It will be appreciated that a displacement DL1 of even only a few microns (um) can cause 2-3 times (or more) image offset when engaging a target, which can be particularly problematic when accuracy is critical. For example, a lens displaced by only 10 μm could cause the focal offset of for example 25 μm, 50 μm, or more, which can correspond to several pixels of error, and cause the apparent position of the target (not corrected to account for any error, also referred to as the estimated position) to be significantly different from the corrected (actual) position of the target by up to several inches or even several feet, depending on the range to the target. The magnitude of the angular inaccuracy induced by the image shift is proportional to the magnitude of the lateral image shift error and divided by the effective focal length of the lens assembly.

It is to be understood that FPA and objective lens assembly lateral misalignments along the X-axis and the Y-axis are linear and any misalignments correspond to the image shift error in a one-to-one (1:1) ratio, meaning each alignment has a corresponding image shift error. For example, when moving the FPA alone, if the mechanical translational error is 12 μm and the pixel pitch is 12 μm, then the FPA has moved off center by 1 pixel. If the movement is 24 μm, then the movement off center corresponds to 2 pixels, and so on in a linear fashion. The misalignment of the optical axis, whether moving the objective lens or the FPA is generally the same; as it is a 1:1 relationship.

Although the misalignment of the FPA to the lens assembly during focus adjustment is minimized though the use of precision mechanical components and other techniques, a small amount of translational error will still remain. It can be understood that movement of the FPA or the lens assembly as a group leads to a 1:1 image shift error. However if the 1:1 relationship can be reduced to a number with an absolute value less than unity, as described herein, a lateral shift in the focus mechanism will not correspond to a 1:1 error, but instead 1:2, 1:3, or even less. In this situation, a lateral shift of the focusing element by a distance of 12 μm will only correspond to 6 μm or 4 μm, respectively, and lead to a decrease in the image shift error of the system.

Any reduction below the 1:1 ratio is advantageous. The smaller the ratio the better. In one embodiment, the lens design had a reduction in error of 76%. In some cases, a reduction in error of at least 10% is expected. Knowing if a design has minimized or has been optimized for image shift error is generally assessed by analyzing the design, and more conclusively by evaluating the design files that the engineer used to produce the lens design. Analysis for boresight error reduction in a design may be accomplished using merit functions operands that determine the boresight error when lenses are displaced. Mechanical displacements may be simulated in the optical design program and the subsequent boresight error measured. The value of the merit function operand could then be driven to a target value of zero, a small value, or otherwise minimized. It would also be possible to measure the boresight error using mechanical simulations and manual measurements, without an automatic optimization. Multiple designs could be evaluated independently and the best design with the lowest sensitivity to errors be chosen. In another method, other parameters may be optimized which have a derivative or secondary effect on affecting boresight. For instance, one may use the merit function operands to constrain a lens or lens group to have a low effective focal length to decrease system sensitivity to boresight error.

It is desirable for the translational error of the individual lens element in the X/Y plane to correspond to an image shift error ratio of less than unity on the FPA. According to the present disclosure, the lens assembly compensates for focus, temperature, or other factors, where the translational error induced during lens element motion corresponds to a reduced amount of image shift error on the FPA.

Figure 2:
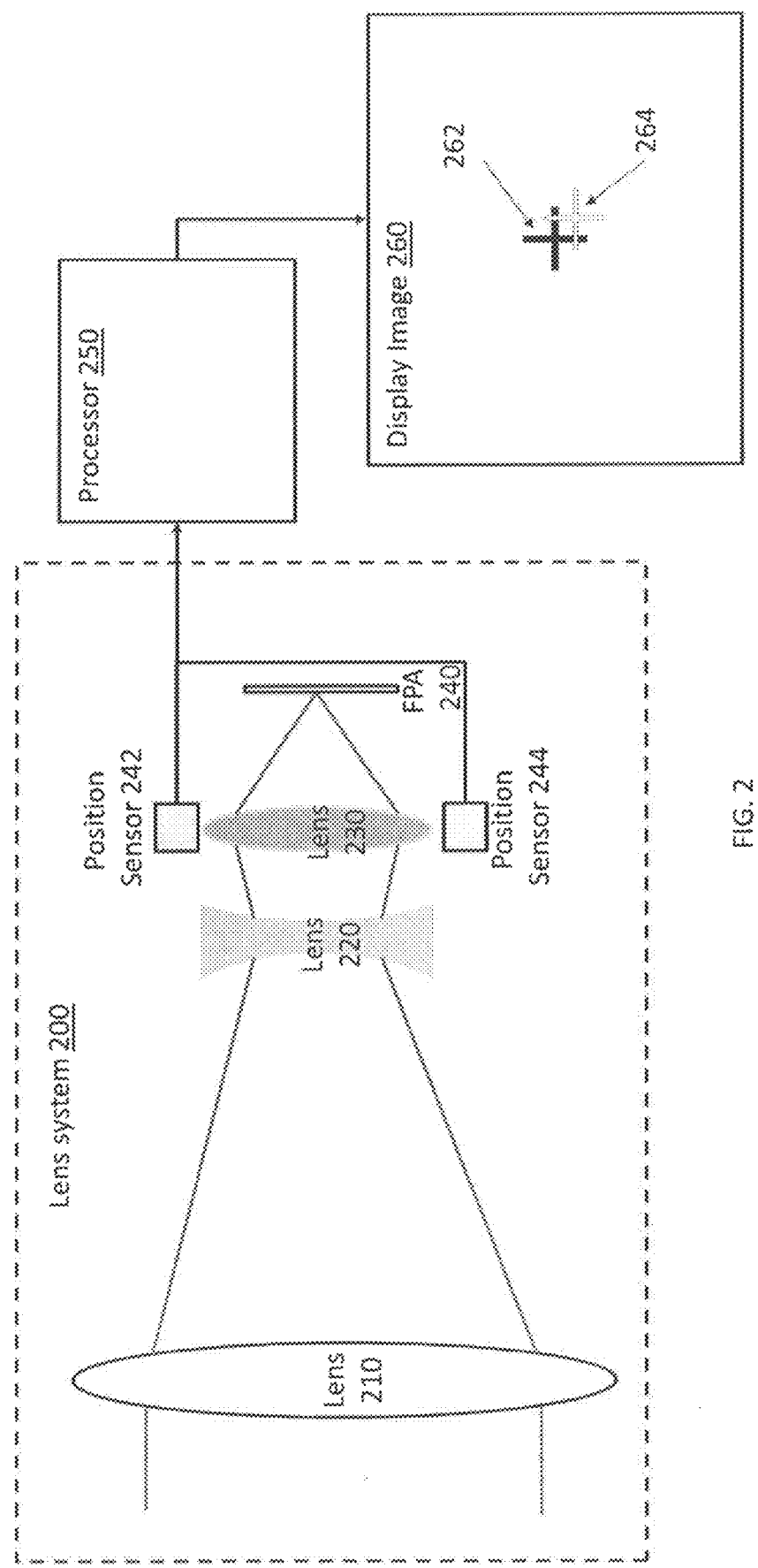
FIG. 2 is a diagram illustrating an embodiment implementing position sensors for one or more of the lenses and one or more processors configured to gather data from one or more position sensors and update the reticle position as needed, according to the present disclosure.

FIG. 2 is a diagram illustrating an embodiment implementing position sensors for one or more of the lenses of the lens system and a processor coupled to the lens system that is configured to gather data from position sensors and update the reticle position, as needed, according to the present disclosure to help minimize image shift. The lens system 200 includes a first lens 210, a second lens 220, a third lens 230, and a focal plane array (FPA) 240. There are at least one position sensors 242, 244 that detect the position of lens 230. Additional position sensors may be used to detect the position of lens 210 and/or lens 220. In some embodiments, only one lens, lens group, or lens sub-assembly, such as lens 230, may have at least one corresponding position sensor provided. The position sensors 242, 244 are coupled to a processor 250 and are configured to determine the position of the lenses, lens, lens group, or lens group sub-assembly. The position sensors can use laser, electrical, magnetic, or other sensor techniques. Hall effect sensors may be a preferred embodiment as it measures the magnitude of a magnetic field. Its output voltage is directly proportional to the magnetic field strength through it. These sensors can be used for proximity sensing, positioning, speed detection, and current sensing applications. Optical methods may provide remarkably high sensitivity and be robust against temperature variation.

Figure 4:
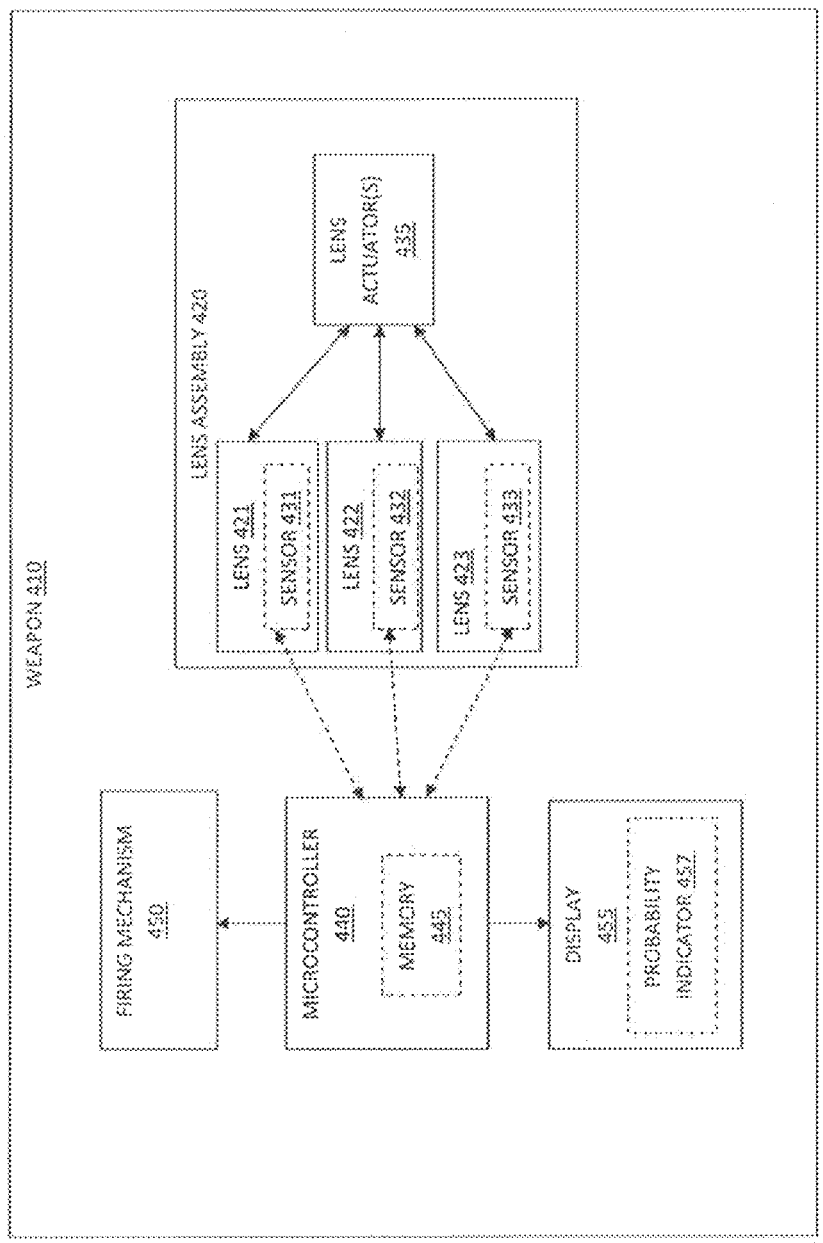
FIG. 4 is a block diagram showing an embodiment implementing position sensors that detect the position of one or more lenses and actuators coupled to the one or more lenses that move the lenses as necessary to achieve a desired (optimally zero) lens translation error, thereby reducing image shift error, according to one embodiment of the present disclosure.

Still referring to FIG. 2, the processor 250 takes the lens position measurement from the sensors 242, 244 which are translated via a lookup table stored in memory to determine image shift error and subsequently any error in reticle placement due to lens displacement error. The processor further calculates a new corrected reticle position or displays the scene differently relative to a fixed reticle position. In some embodiments described herein, rather than calculating a new reticle position or modifying the scene location presented, or in addition thereto, the processor may be configured to move the lens to a new position via at least one actuator coupled to the processor and to the appropriate lens(es), to reduce or eliminate any image shift error resulting from improper placement of one or more of the components of the lens assembly. See, for example, FIG. 4 showing an implementation including actuators and sensors.

Using data from the FPA, an estimated position (i.e., where the lens assembly thinks the target is) can be determined. Also, using the error calculations, a corrected position can also be determined, which is the position with the image shift error taken into consideration. The estimated position of the target is determined via the processor using the lens assembly. The corrected position is also determined via the processor. A display image 260 is output by the processor 250 that includes both the estimated position 262 and the corrected position 264 of the target, although only the corrected position may be displayed, they are both shown on the figure for functional clarity.

In the lens assembly shown in FIG. 2, movement of the second lens 220 and/or the third lens 230 could be moved along the Z-axis to adjust lens focus, while maintaining the focal length, Modulation Transfer Function (MTF), which is a measurement of the optical performance potential of a lens, distortion, color correction, and other critical performance parameters of the lens. In order to adjust focus, the second lens 220 could be moved alone, or the third lens 230 alone, or the second lens 220 and the third lens 230 could be moved as a group.

The following table, Table 1, shows an example of the error that results from each of the lens elements or group of lens elements being moved. The ratio of translational error to image shift error (as determined from the optical model) for each lens element for one embodiment is shown in Table 1 below.

TABLE 1

| Element | Error Ratio |
| --- | --- |
| Lens 210 | 1.237 |
| Lens 220 | −0.701 |
| Lens 230 | 0.465 |
| Lens 220 + 230 | −0.237 |
| FPA | 1.000 |

As can be seen in Table 1, movement of each system element corresponds to an increased or decreased effect on resulting image shift error. The sign of the motions are generally not as important as the magnitudes, so the absolute values should be considered. In Table 1, it can be seen that moving the FPA corresponds to a 1:1 ratio of translational error to image shift error, as expected. Movement of lens 210 would not provide an advantage, as the ratio is greater than 1.0. However, moving either lens 222, lens 230, or lens 220 and 230 as a group does provide advantages in image shift prevention/minimization, as the absolute value of their ratios are less than unity. Therefore, for this specific lens design, the movement of lens 220 and 230 or as a group should be considered as the moving elements of the focus adjustment assembly. Given the values in the table, it is most desirable to move lens 220 and 230 as a group to minimize image shift. Lenses, lens groups, or assemblies may be moved by one or more actuators.

Generally, lens elements or lens groups with lower optical focusing powers (longer effective focal lengths) have error ratio values less than unity, and elements that are closer to the focal plane have lower ratios. The sensitivity of lens elements or lens groups to image shift error can be minimized during the optimization of the lens design, just as any other aberrations may be minimized. By optimizing for image shift within the lens design itself, the result is a passive solution to the inevitable and undesirable cross coupling of motions into orthogonal axes during routine and required focal movements. Passive solutions would not require any additional sensors or actuators, and thusly the passive solution is considered one embodiment due to the simplicity, lower cost, and lower complexity in comparison to an active system that utilizes sensors and/or actuators.

In one embodiment, the error ratio value is defined as follows: the error ratio value is the magnitude of the location for the on-axis chief ray on sensor minus the expected or ideal location of the on-axis chief ray on the sensor, divided by the magnitude of the lens or lens group translation orthogonal to the optical axis. As shown in the following equation:

$$ERV = \frac{|(R_{CR} - E_{CR})|}{|L_t|},$$

where: ERV=Error ratio value; $R_{CR}$=Real location of the chief ray on the sensor; $E_{CR}$=Expected or ideal location of the chief ray location on the sensor; and where both the denominator and numerator are measurements of distance in the same units, thus making the error ratio value a unitless value.

An error ratio less than unity indicates that the system has a boresight sensitivity that is lower than if the sensor and lens assembly were moved separately as two bodies. In such a configuration, when the lens assembly is translated by an amount (x), the location of the chief ray on the sensor moves by the same amount (x). This system configuration has an error ratio value equal to 1.0. However, when the error ratio value is less than one, this means that when a lens or lens group is moved during adjustment (ideally this motion is purely along the optical axis Z) if the motion unintentionally couples into one or both of the orthogonal axes X and/or Y, the realized impact of the boresight error on the sensor is less than that of the lens or lens group translation error. As such errors are unavoidable during motion in Z, any error ratio value less than one is advantageous in retaining boresight and minimizing system level error.

In some embodiments, a single lens element may be moved, and in other embodiments multiple lens elements may be moved to adjust for focus. In embodiments where multiple lenses are moved, the elements may be moved independently or as a group. In some embodiments lens elements may be moved where the FPA is held constant, in other embodiments the FPA may move in conjunction with or independently from other moving elements. If elements are moved independently, a cam system may be used to induce complex motions of the one or more elements and maintain their relationships through focus. Such cam systems have been employed regularly in other optical systems such as zoom lenses and variable magnification rifle scopes.

In a cam system, individual lens elements affixed into mechanical cells ride along slots in the cam tube. When the cam tube is rotated, the pressure of the cam tube on the lens element cells causes a motion of the lens element along the optical axis. As the cam slots can have complex shapes and can be attached to multiple lens element cells the relative motions can be complex to maintain optimal lens performance parameters through the adjustment of focus.

Alternatively, in some embodiments the lens cells would not be controlled by a common cam system, but by two independent mechanisms, which may require two separate electromechanical actuators (for example, actuator(s) 435 in FIG. 4), arranged to operate in a simultaneous or in a pseudo-simultaneous manner. Multiple elements may also be geared together or otherwise mechanically coupled to induce the desired motions. The focus adjustment mechanism can be actuated by manual input such as a knob, motorized using a step motor, a piezo motor, magnetic coil, or other type of actuator, or any combination thereof.

Actuation may be direct drive, or via a gear or gear system, lever or any combination thereof. The gear systems used to drive one or more lens cells may include worm gears, pinions, ring gears, a combination thereof, or any other combination of gearing assembly.

Figure 3:
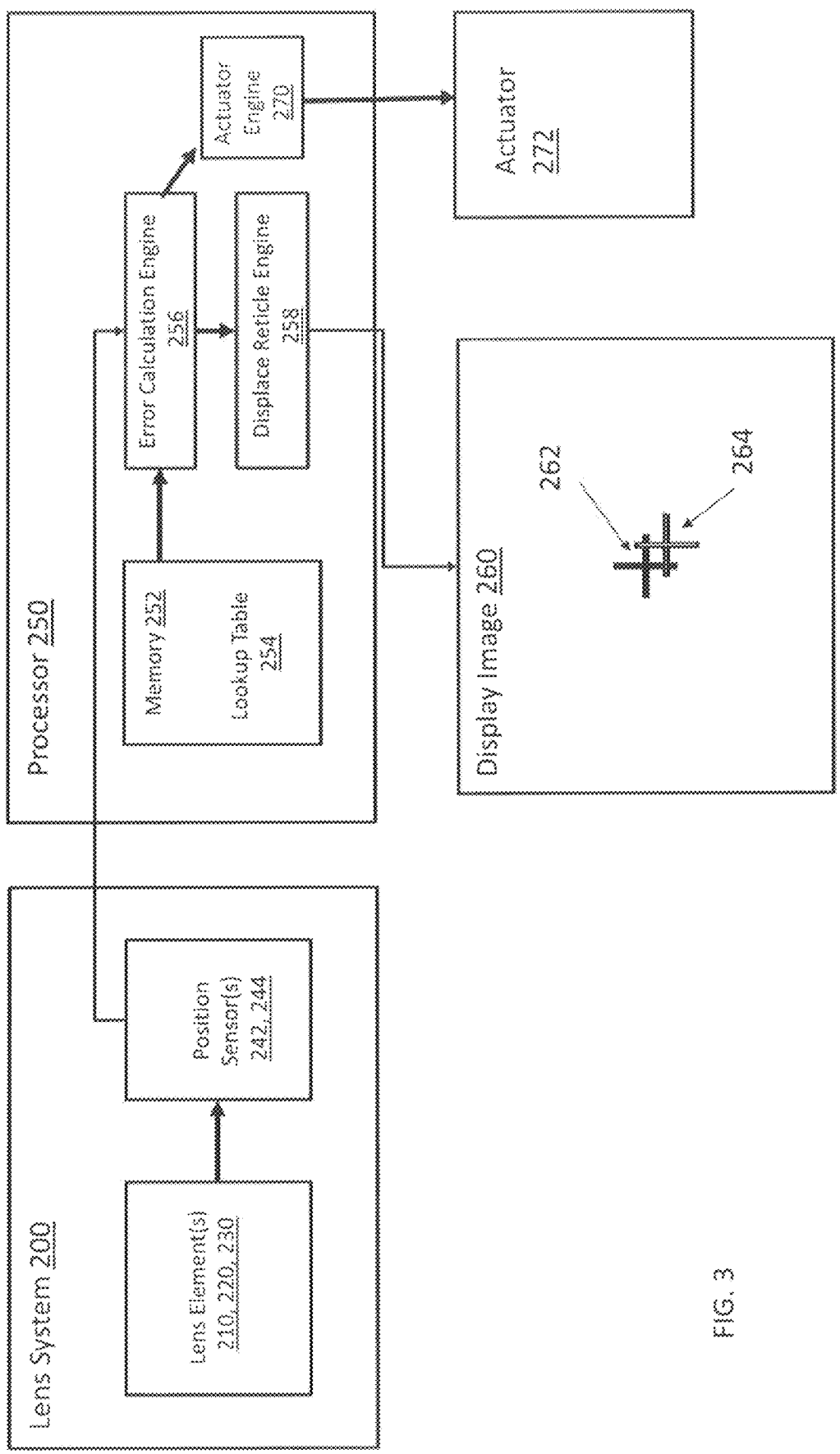
FIG. 3 is a block diagram of the lens assembly system and processor and associated output display image, according to one embodiment of the present disclosure.

FIG. 3 is a block diagram of the lens assembly system and processor and associated output display image, according to the present disclosure. The lens system 200 and processor 250 can be the same as those shown in FIG. 2, with the processor 250 shown in greater detail in FIG. 3. The lens system 200 includes lens elements 210, 220, 230 and the position sensors 242, 244 which provide position information to the processor 250. An error calculation engine 256 utilizes the position detected by the sensor, combined with data from memory 252, such as a lookup table 254 comprising error ration data, to calculate the error in a reticle placement. The displace reticle engine 258 then determines an appropriate placement for a "new" (corrected) reticle position 264 so that the original estimated position 262 and the corrected position 264 can be displayed in a display image 260 of a display coupled to the processor 250.

Still referring to FIG. 3, the error calculation engine 256 may be coupled to an actuator engine 270 that is configured to control one or more actuators 272 to adjust one or more lenses in response to the error calculation. In some embodiments, rather than displaying both the estimated position 262 and the corrected position 264, a percentage or probability of accurately hitting the target may be displayed, based upon the image shift error calculation and analysis performed by the processor 250. Thus, in some instances, rather than calculating a new reticle position, or in addition thereto, the processor may be configured to move the lens to a new position via actuators coupled to the processor and to the appropriate lens or lenses based on the lookup table values.

Lookup table values can be generated based on the optical model where the translation vs. boresight error values are simulated. If these values change based on environment or other parametric function with multiple inputs, then a more complex lookup table with multiple dimensions could be generated. Alternatively, the lookup table may be an equation that includes multiple input variables to determine the appropriate amount of lens shift to compensate. In one example, if a 10 micron displacement induces a 1 pixel boresight error, it would be desirable for the position sensor and actuator to be accurate to 1 um. However, even a system with a position accuracy of 5 um would be desirable. So long as the translation errors induced during lens motions are above the measurement and movement resolution threshold, an advantage over no motion is attained. However, assuming a translation error of 10 um induces a 1 pixel shift on the FPA, and the actuator system has an accuracy of 20 um and/or the position measurement sensor has an accuracy of 20 um, then it would not be advantageous to use an active correction system, as it would have a high probability of inducing more error than if it were not present.

An active system that utilizes actuators and sensors as shown in FIG. 3 would be used when extreme precision is necessary. Passive systems that do not use sensors and actuators are for embodiments where weight, cost, and/or power use is a priority. Even in the case of an active system, it is desirable to passively reduce the sensitivity of the lens system to translation induced boresight error. However, in some cases the optical design is constrained where other performance parameters take priority, and it may not be possible to also include an optimized decreased sensitivity to boresight shift. In these cases an active system utilizing sensors and actuators may be used to compensate for unwanted system sensitivity.

FIG. 4 is a block diagram showing an embodiment where the lens assembly is configured as a weapon sight for a weapon 410. In some cases, the weapon sight includes position sensors that detect the position of one or more lenses and actuators coupled to the one or more lenses to move the lenses as necessary to achieve a desired (optimally zero) lens translation error, thereby reducing image shift error, according to the present disclosure. The weapon 410 includes a lens assembly 420, which may be the same as or substantially similar to lens assembly 100 shown in FIGS. 1A and 1B, lens system 200 shown in FIG. 2, or lens assembly 200 shown in FIG. 3. The lens assembly 420 includes a first lens 421, a second lens 422, and a third lens 423, each having a respective sensor suite 431, 432, 433 configured to detect the position of each respective lens. Each lens may have more than one sensor to detect its position; however a single sensor is shown in the figure for simplicity. In certain embodiments, each lens is coupled to a lens actuator suite 435, which may include one separate actuator or set of actuators for each lens, or one actuation mechanism that controls the position of all three lenses, or some combination thereof. In one embodiment, the lens actuator suite 435 is controlled by a microcontroller 440, which is coupled to receive the position measurements from the sensor suites 431, 432, 433. The microcontroller 440 can comprise or include a processor or microprocessor, such as processor 250 shown and described herein. In some cases, the microcontroller 440 includes a memory 445 which for example may store a lookup table of ideal positions for the lenses of the lens assembly and may further store measured positions of the lenses for subsequent calculations, as described herein in greater detail. In some cases, the microcontroller 440 can be configured to control the firing mechanism 450, or otherwise provide a signal or other indication to the firing mechanism 450, based on the calculations performed in error shift image analysis using the position of the lenses 421, 422, 423, as obtained from the sensor suites 431, 432, 433.

In some cases, the microcontroller 440 is coupled to a display 455, which may for example comprise the display image 260 herein, and can further include a probability indicator 457. The probability indicator can be used to indicate the probability of success of engaging a target based upon the calculations from the processor (i.e., from the error calculation engine). The probability may be based on a difference between the estimated position of the target (i.e., the original position determined without any error calculation or compensation) and the corrected position of the target (i.e., with the image shift taken into account).

Figure 5:
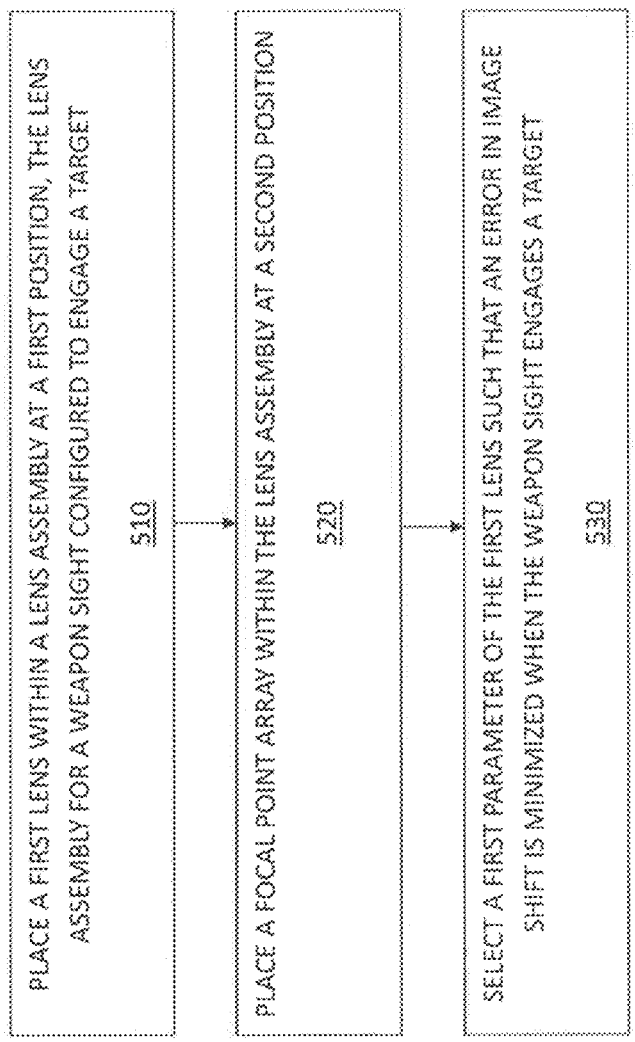
FIG. 5 is a flowchart of one embodiment of a method according to the principles of the present disclosure.

FIG. 5 is a flowchart of one embodiment of a method according to the principles of the present disclosure. At block 510, the method commences by placing a first lens within a lens assembly at a first position. The lens assembly is for a weapon sight. At block 520, a focal plane array (FPA) is placed within the lens assembly at a second position. At block 530, a first parameter of the first lens is selected such that an error in image shift is minimized when the weapon sight engages a target.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A lens assembly for a weapon sight, the lens assembly comprising:
   at least a first lens, the lens assembly having an optical axis; and
   a focal plane array (FPA) coaxial with the optical axis of the lens assembly;
   the lens assembly being configured to have a translational error ratio value less than unity via using a first parameter of each lens in the lens assembly to minimize an error in image shift, wherein the first parameter is at least one of lateral position, axial displacement, thickness, material, effective focal length, radius of curvature, conic constants, and higher order aspheric coefficients and wherein the translation error ratio less than unity is one wherein the lens assembly has a boresight sensitivity that is lower than that of the FPA and lens assembly if the FPA and lens assembly were moved separately as two bodies.

2. The lens assembly of claim 1, further comprising a second lens coaxial with the optical axis of the first lens, wherein the first parameter of the first lens and a second parameter of the second lens are selected that further minimizes the error in image shift when the weapon sight lens motions are initiated, wherein the second parameter is at least one of lateral position, axial displacement, thickness, material, effective focal length, radius of curvature, conic constants, and higher order aspheric coefficients.

3. The lens assembly of claim 2, wherein a third parameter of the lens assembly is selected that further minimizes the error in image shift, the third parameter comprising a lateral distance between the first lens and the second lens.

4. The lens assembly of claim 1, further comprising a sensor coupled to the first lens that is configured to detect a measured position of the first lens.

5. The lens assembly of claim 4, further comprising a processor that compares the measured position of the first lens to an ideal position for the first lens from a lookup table stored in memory.

6. The lens assembly of claim 5, further comprising an actuator coupled to the first lens that is configured to move the first lens to the ideal position.

7. A method for configuring a lens assembly for a weapon sight, the method comprising:
   placing a first lens within the lens assembly at a first position;
   placing a focal plane array within the lens assembly at a second position; and
   selecting a first parameter of the first lens such that an error in image shift is minimized;
   the lens assembly being configured to have a translational error ratio value less than unity via using a first parameter of each lens in the lens assembly to minimize an error in image shift, wherein the first parameter is at least one of lateral position, axial displacement, thickness, material, effective focal length, radius of curvature, conic constants, and higher order aspheric coefficients and wherein the translation error ratio less than unity is one wherein the lens assembly has a boresight sensitivity that is lower than that of the FPA and lens assembly if the FPA and lens assembly were moved separately as two bodies.

8. The method of claim 7, further comprising calculating the error in image shift by a processor of the lens assembly.

9. The method of claim 8, further comprising displaying an estimated position of a target in a field of view of the weapon sight; and displaying a corrected position of the target in the field of view of the weapon sight.

10. The method of claim 7, further comprising detecting a measured position of the lens with a sensor coupled to the lens assembly.

11. The method of claim 10, further comprising comparing the measured position to an ideal position in a look up table stored in memory, and calculating the error in image shift based on a difference between the measured position and the ideal position.

12. The method of claim 10, further comprising comparing the measured position to an ideal position in a look up table stored in memory, and moving the lens to the ideal position by an actuator coupled to the lens.

13. A lens assembly for a weapon sight, the lens assembly comprising:
 a first lens having an optical axis;
 a focal plane array (FPA) coaxial with the optical axis of the first lens;
 a sensor coupled to the first lens that is configured to detect a measured position of the first lens; and
 a processor configured to compare the measured position of the first lens to an ideal position from a lookup table stored in memory;
 wherein a first parameter of the first lens is selected that minimizes an error in image shift,
 the lens assembly being configured to have a translational error ratio value less than unity via using a first parameter of each lens in the lens assembly to minimize an error in image shift, wherein the first parameter is at least one of lateral position, axial displacement, thickness, material, effective focal length, radius of curvature, conic constants, and higher order aspheric coefficients and wherein the translation error ratio less than unity is one wherein the lens assembly has a boresight sensitivity that is lower than that of the FPA and lens assembly if the FPA and lens assembly were moved separately as two bodies.

14. The lens assembly of claim 13, further comprising an actuator coupled to the first lens that is configured to move the first lens to the ideal position from the lookup table stored in memory.

15. The lens assembly of claim 13, wherein the processor is further configured to calculate an error based on a difference between the ideal position and the measured position.

* * * * *